(12) United States Patent
Kumai

(10) Patent No.: US 7,237,910 B2
(45) Date of Patent: Jul. 3, 2007

(54) IMAGE PROJECTOR

(75) Inventor: Katsunori Kumai, Hino (JP)

(73) Assignee: Olympus Corporation, Tokyo (JP)

( * ) Notice: Subject to any disclaimer, the term of this patent is extended or adjusted under 35 U.S.C. 154(b) by 161 days.

(21) Appl. No.: 11/005,760

(22) Filed: Dec. 7, 2004

(65) Prior Publication Data
US 2005/0140937 A1 Jun. 30, 2005

(30) Foreign Application Priority Data
Dec. 26, 2003 (JP) .............. 2003-432948

(51) Int. Cl.
*G03B 21/20* (2006.01)
*G03B 21/14* (2006.01)
*G03B 21/22* (2006.01)

(52) U.S. Cl. .............. 353/97; 353/85; 353/119

(58) Field of Classification Search .............. 353/20, 353/97, 85, 87, 94, 119; 362/362
See application file for complete search history.

(56) References Cited

U.S. PATENT DOCUMENTS 6,698,899 B2  3/2004  Yamada et al.
6,805,448 B2 * 10/2004 Yokoyama et al. ............ 353/85
7,088,321 B1 *  8/2006 Parker ............................ 345/83
2003/0218723 A1 * 11/2003 Yamanaka ...................... 353/30
2004/0090602 A1 *  5/2004 Imade ......................... 353/102

FOREIGN PATENT DOCUMENTS

| JP | 06-186528   | 7/1994  |
| JP | 11-231413   | 8/1999  |
| JP | 2002-107823 | 4/2002  |
| JP | 2003-344948 | 12/2003 |
| JP | 2003-346503 | 12/2003 |

* cited by examiner

Primary Examiner—Melissa Jan Koval
Assistant Examiner—Andrew Kong
(74) Attorney, Agent, or Firm—Volpe & Koenig PC

(57) ABSTRACT

An image projector projects images according to inputted image data. A light source unit has at least a plurality of LED light sources configured as a single unit for emitting an illumination. A space modulation element is modulated according to inputted image data. An illumination optical unit leads the illumination light emitted from the light source unit, and illuminates the space modulation element. A projection optical unit projects an image illuminated by the illumination optical unit and modulated by the space modulation element. The light source unit is configured removably from the image projector.

3 Claims, 7 Drawing Sheets

IMAGE PROJECTOR

CROSS-REFERENCE TO RELATED APPLICATIONS

This application is based upon and claims the benefit of priority from prior Japanese Patent Application No. 2003-432948, filed Dec. 26, 2003, the entire contents of which are incorporated herein by reference.

BACKGROUND OF THE INVENTION

1. Field of the Invention

The present invention relates to an image projector which projects images according to inputted image data.

2. Description of the Related Art

A projector using a lamp as a light source is well known, as disclosed in Jpn. Pat. Appln. KOKAI Publication Nos. 11-231413 and 2002-107823, for example. A display using LEDs as a light source is also well known, as disclosed in Jpn. Pat. Appln. KOKAI Publication No. 6-186528.

BRIEF SUMMARY OF THE INVENTION

According to the first aspect of the present invention, there is provided an image projector which projects images according to inputted image data, comprising:

a light source unit having at least a plurality of LED light sources configured as a single unit for emitting an illumination light;

a space modulation element which is modulated according to inputted image data;

an illumination optical unit which guides the illumination light emitted from the light source, and illuminates the space modulation element; and a projection optical unit which projects an image illuminated by the illumination optical unit and modulated by the space modulation element, wherein the light source unit is configured removably from the image projector.

According to the second aspect of the present invention, there is provided an image projector according to the first aspect, wherein the light source unit has a driving unit to drive the LED light sources.

According to the third aspect of the present invention, there is provided an image projector according to the first aspect, wherein the light source unit has a radiation unit which escape the heat generated by the LED light sources to the outside of the light source unit.

According to the fourth aspect of the present invention, there is provided an image projector according to the first aspect, wherein the illumination optical unit is configured as one body with the light source unit, and removably from the image projector.

According to the fifth aspect of the present invention, there is provided an image projector according to the fourth aspect, wherein when the light source unit is mounted in the image projector, the light source unit is positioned based on the position of the space modulation element.

According to the sixth aspect of the present invention, there is provided an image projector according to the fourth aspect, wherein the light source unit has a light source information holding member which holds the information about the LED light sources.

According to the seventh aspect of the present invention, there is provided an image projector according to the sixth aspect, wherein the information about the LED light sources is a reference value of the voltage applied to the LEDs when the LED light sources are driven.

According to the eighth aspect of the present invention, there is provided an image projector according to the first aspect, wherein when the light source unit is mounted in the image projector, the light source unit is positioned based on the position of the illumination optical unit.

According to the ninth aspect of the present invention, there is provided an image projector according to the first aspect, wherein the light source unit has a shutter unit which protects the light emitting surface of the LED light sources; and the shutter unit opens when the light source unit is mounted in the image projector, and closes when the light source unit is removed from the image projector.

According to the tenth aspect of the present invention, there is provided an image projector according to the first aspect, wherein the light source unit has a light guide unit which is synchronized with the lighting timing of the LED light sources and moved relatively to the LED light sources, and leads the illumination light emitted from the LED light sources which are sequentially lit in time series, to the space modulation element.

According to the eleventh aspect of the present invention, there is provided an image projector according to the tenth, wherein the light source unit has the LED light sources arranged on the circumference; and the illumination optical unit rotates the light guide unit around the center of the circumference on which the LED light sources are arranged.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained in detail hereinafter with reference to the accompanying drawings.

EMBODIMENT 1

Figure 1:
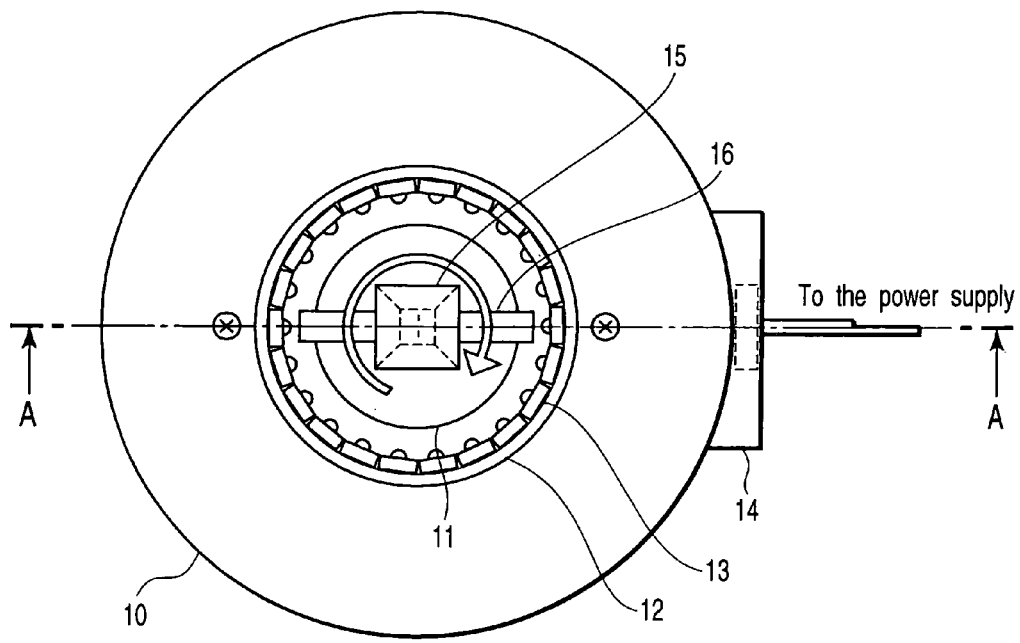
FIG. 1 is a view showing the configuration of an image projector (at operation) according to a first embodiment of the present invention.
Figure 2:
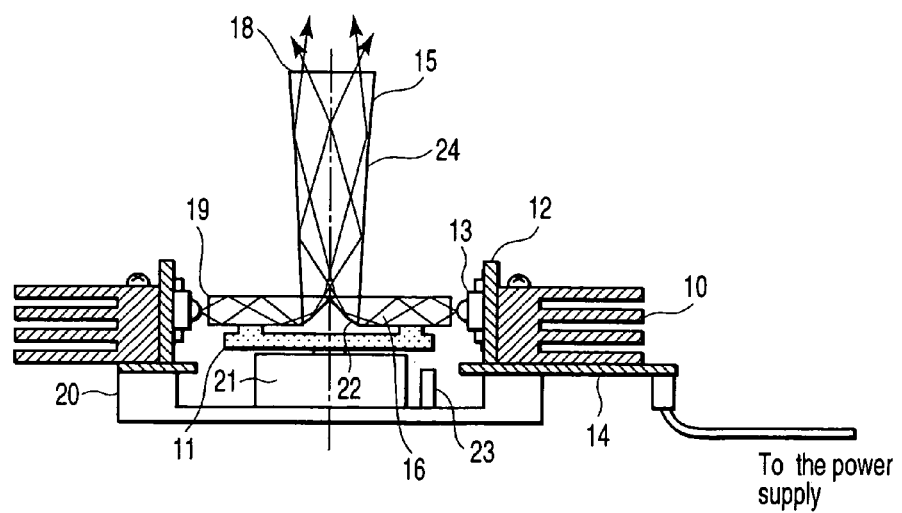
FIG. 2 is a sectional view taken on the arrow-indicated line A—A of FIG. 1.
Figure 3:
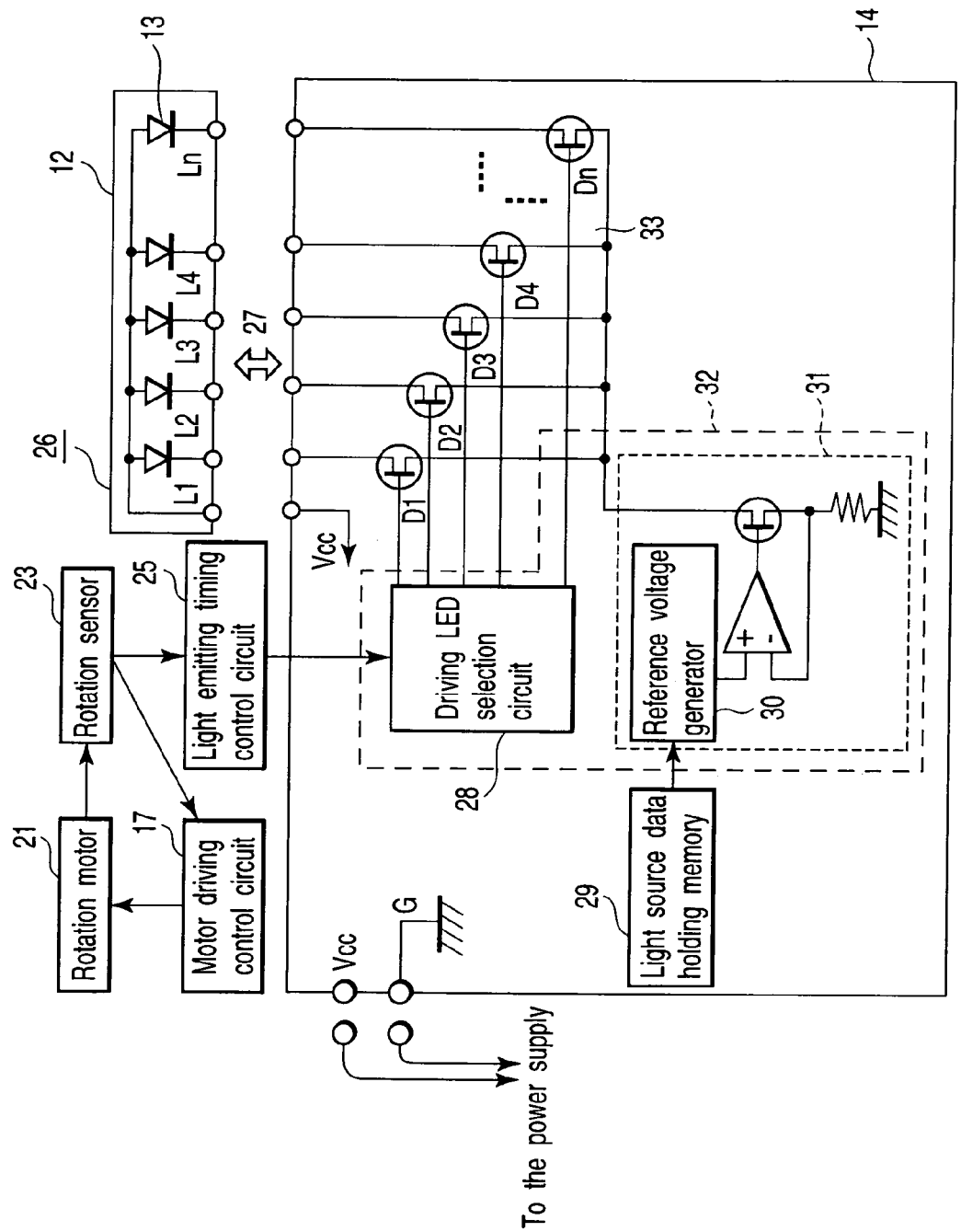
FIG. 3 is a functional block diagram showing the configuration of the image projector according to the first embodiment of the invention.

FIG. 1 is a view showing the configuration of the image projector (at operation) according to the first embodiment of the present invention. FIG. 2 is a sectional view taken on the arrow-indicated line A—A of FIG. 1. FIG. 3 is a functional block diagram showing the configuration of the image projector according to the first embodiment of the invention.

As shown in the drawings, in an image projector according to a first embodiment, a light guide rod member 24 that is a square optical unit consisting of a T-shaped optical plane fixed to a rod holder 11 or a rotatable holder is rotated by a rotation motor 21 as a driving unit, and LEDs 13 as light emitting elements arranged in the internal circumference of an LED board 12 formed like a drum are sequentially lit simultaneously with rotation of the light guide rod member 24.

The light guide rod member 24 is made of a glass or resin transparent to the wavelengths of an illumination luminous flux, and is processed as an optical mirror to lead light by total internal reflection to increase the efficiency of taking in light.

The T-shaped light guide rode member 24 may be molded as one body, or formed by combining five parts including a square parallel rod 16, a reflection prism 22 with reflective coating on its side for bending an optical path, and a-tapered rod 15 as shown in FIG. 2. In the case of combining the five parts, the refractive indexes of parallel rod 16, reflection prism 22 and tapered rod 15 may not necessarily be the same. The refractive index of the reflection prism is desirably higher than those of the parallel rode 16 and tapered rod 15, to reduce light leakage from the sides of the members.

Among the rays passing through the reflection prism 22, the rays with the angles passing through the parallel rod 16 or tapered rod 15 without reflecting on the side of these rods are reflected into the reflection prism 22 on the joint surface of the parallel rod 16 and the joint surface of the tapered rod 15 and reflection prism 22 by increasing the refractivity of the reflection prism 22, and as a result, the light leaked from the sides of the members is decreased.

The above LEDs 13 arranged in the internal circumference of the drum-like LED board 12 consist of set of given numbers of LEDs having emission colors of red (R), green (G) and blue (B). They illuminate a not-shown illuminating area, taking an emission end face 18 of the light guide rod member 24 as a virtual light source.

A rotation sensor 23 for detecting the rotation position of the rod holder 11 is provided near the side of the rod holder 11. As this rotation sensor 23, for example, a photo-reflector can be used to detect one rotation of the rod holder 11 by detecting the light reflected from a reflection plate stuck to the side of the rod holder 11.

The rotating position detection signal of the rotation sensor 23 is applied to a motor driving control circuit 17 and a light emitting timing control circuit 25 of FIG. 3.

The motor driving control circuit 17 controls the rotation motor 21, and constitutes a movable unit for rotatably driving the light guide rod member 24, together with the rotation motor 21. Namely, when an operation start signal is inputted by the user pressing the corresponding button, the motor driving control circuit 17 starts rotation of the rotation motor 21, and controls the motor 21 according to the rotating position of the rod holder 11 detected by the rotation sensor 23, so that the motor rotates at a constant speed.

The light emitting timing control circuit 25 is connected to a driving LED selection circuit 28, and constitutes a lighting control unit for controlling the light emitting timing of the LEDs 13, together with an LED driving control circuit 32 that receives the detection result of the rotation sensor 23. The LED driving control circuit 32 consists of a driving LED selection circuit 28 and an LED driving current control circuit 31.

The LED driving current control circuit 31, light source information holding memory 29 and LED driving circuit 33 as a driving unit are mounted on a control circuit board 14. The LEDs 13 are mounted on the LED board 12, constituting a light source unit 26. The light source unit 26 and control circuit board 14 are removably connectable through a connector 27.

The light emitting timing control circuit 25 generates a timing signal based on the rotation position of the rod holder 11 detected by the rotation sensor 23, and applies the signal to the driving LED selection circuit 28 of the LED driving control circuit 32. According to the inputted timing signal, the driving LED selection circuit 28 gives a driving control signal selectively to the LED driving circuits (D1–Dn) for driving the LEDs (L1–Ln) 13 mounted on the LED board 12, and controls the LED driving circuits to sequentially turn on the LEDs (L1–Ln) 13 positioned to the incident end face of the light guide rode member 24, or the plane of incidence of the parallel rod 16. The driving current of LEDs (L1–Ln) 13 of the LED driving circuits (D1–Dn) is controlled by the LED driving current control circuit 31 of the LED driving control circuit 32, so that the amount of emitted light from LEDs (L1–Ln) becomes optimum.

In the outer circumference of the drum-like LED board 12, a heat sink 10 is provided as a radiation unit, which radiates the heat generated by lighting of the LEDs (L1–Ln) 13, and prevents variations in the performance of LEDs (L1–Ln) caused by the heat, providing stable illumination even if the image projector is continuously operated.

The LEDs (L1–Ln) 13 are sequentially switched to emit a pulse light as described above, and the position relative to the light guide rod member 24 that takes in the emitted light is selected and changed simultaneously with switching of the lights of LEDs (L1–Ln) 13. Thus, the emitted light color is changed in the order of red (R), blue (B), green (G), red (R), blue (B) and green (G) in the process that the light guide member 24 makes one rotation, three colors of LED with high luminance are effectively obtained, and a large amount of three colors of light improved in parallelism is obtained from the emission end face of the light guide rod member 24. The order of emitted light colors is not limited to the above, and may be appropriately set.

In this configuration, the relative position shift of LEDs (L1–Ln) 13 and light guide rod member 24 is produced by rotating the light guide rod member 24, but it is also realizable by moving the LEDs (L1–Ln) 13. It is however preferable to move the light guide rod member 24 from the viewpoint of supplying power to the LEDs (L1–Ln).

Figure 4:
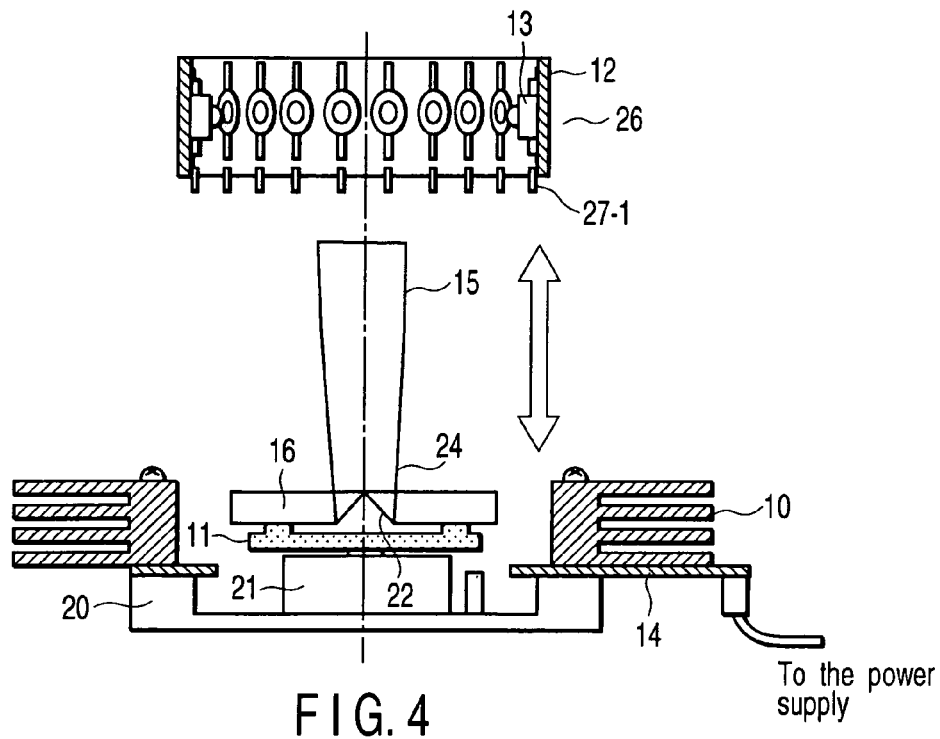
FIG. 4 is a view for explaining disassembly and replacement of the image projector according to the first embodiment.

Explanation will now be given on disassembly and replacement of the image projector according to the above-mentioned first embodiment with reference to FIG. 4. FIG. 4 shows the light source unit 26 in the state removed from the image projector. The light source unit 26 is composed of LEDs 13, LED board 12, and connector pin 27-1 for connecting the LED board 12 and control circuit board 14. The center axis of the light source unit 26 and the rotation center of the light guide rod member 24 are positioned based on the outside diameter of the cylinder of LED board 12 and the inside diameter of the heat sink. Positioning of the light source unit 26 and the light guide rod member 24 in the direction of the rotation axis is performed by butting the end face of the LED board 12 of the light source unit 26 against the control circuit board 14.

By limiting the configuration of a replacement light source unit 26 to a group of LEDs, the required replacement cost can be minimized.

EMBODIMENT 2

Explanation will be given on a second embodiment of the invention.

Figure 5:
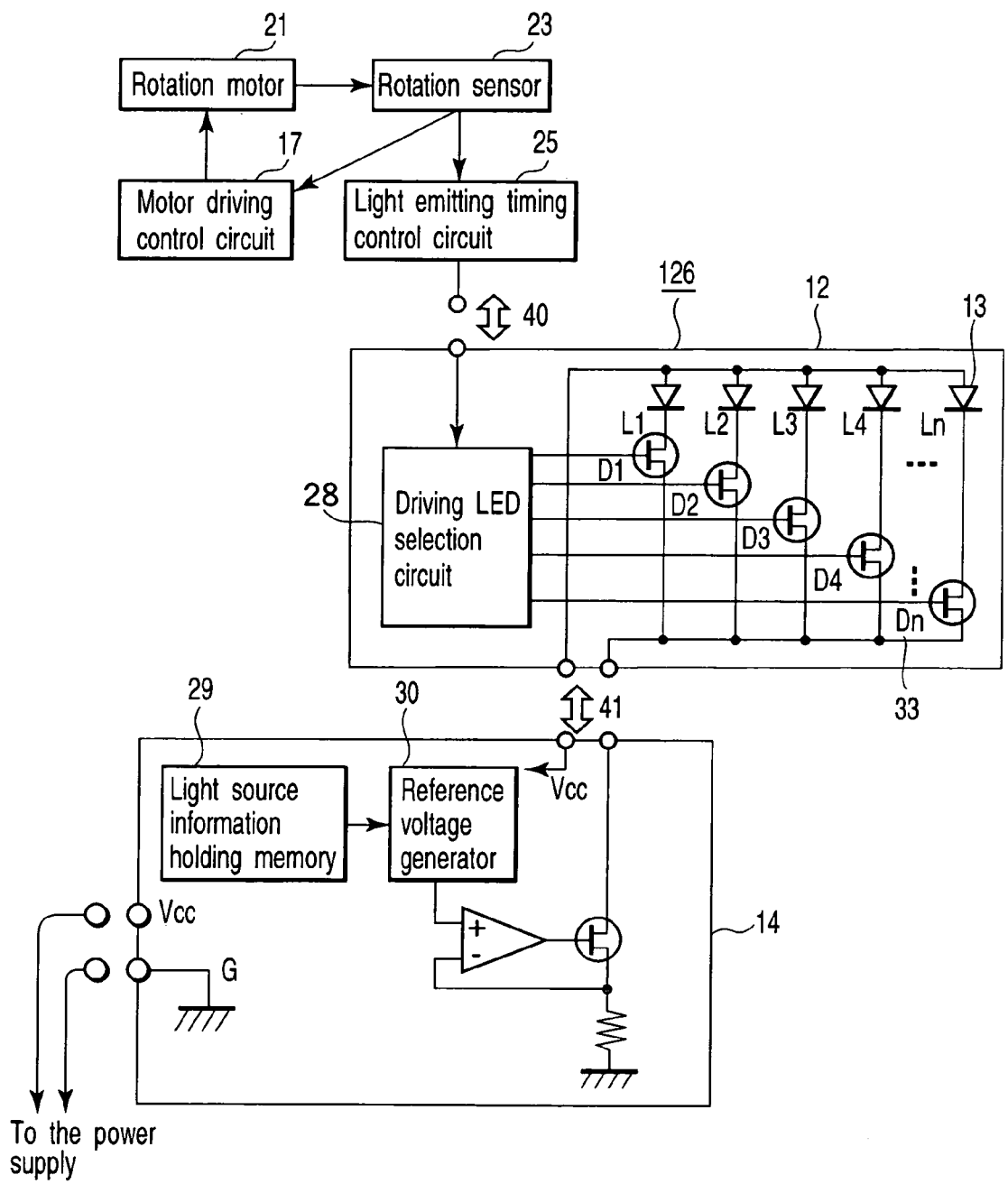
FIG. 5 is a functional block diagram showing the configuration of a second embodiment of the present invention.

FIG. 5 is a functional block diagram showing the configuration of the second embodiment of the invention. In the second embodiment, the LEDs 13, LED driving circuit 33 for switching the LEDs 13, and driving LED selection circuit 28 are mounted on the LED board 12, constituting a light source unit 126. In this case, only the light source information holding memory 29 and reference voltage generator 30 are mounted on the control circuit board 14.

According to the above configuration of the second embodiment, the number of connector pins for connecting the light source unit 126 and control circuit board 14 is reduced, the configuration is simplified, and the reliability is increased.

EMBODIMENT 3

Explanation will be given on a third embodiment of the invention.

Figure 6:
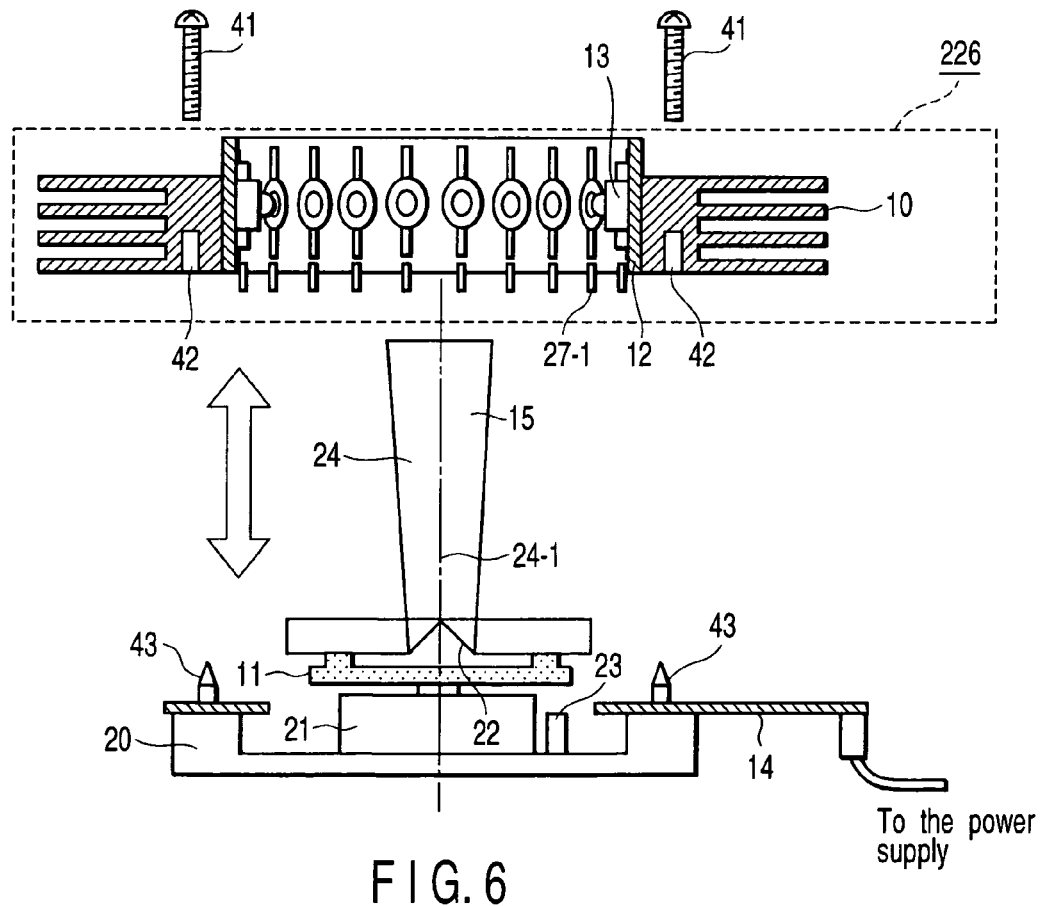
FIG. 6 is a view showing the configuration of a third embodiment of the present invention.

FIG. 6 is a view showing the configuration of the third embodiment of the invention. In the third embodiment, the LEDs 13 are mounted on the LED board 12 having a wiring pattern of the LEDs 13. The LED board 12 and control circuit board are connected through the connector pin 27-1. Further, the heat sink 10 as a radiator member is provided adjacent to the LED board 12. The above components constitute a light source unit 226.

When mounting the light source unit 226 in the apparatus, the position of the light source unit 226 is determined based on the position of the light guide rod member 24 constituting an illumination optical unit. Namely, positioning of the center axis of the light source unit 226 and the rotation center of the light guide rod member 24 is performed by using a positioning pin 43 provided in the base 20 and a positioning hole 42 in the heat sink 10. Positioning of the light source unit 226 and light guide rod member 24 in the rotation axis direction is performed by butting the light source unit 226 against the control circuit board 14. Positioning of the light source unit 226 around the rotation axis is performed by making the diameters of the two positioning pins 43 located symmetrically with respect to the rotation axis 24-1 different, preventing mounting in an incorrect direction. The light source unit 226 is fixed to the apparatus with a fixing screw 41.

In the third embodiment, the LEDs 13 and LED board 12 as heating parts are configured to be directly in contact with the heat sink 10 as a radiating member, and thus the heat resistance is decreased. Therefore, the heat generated from the LEDs 13 is efficiently released to the outside.

EMBODIMENT 4

Explanation will be given on a fourth embodiment of the invention.

Figure 7:
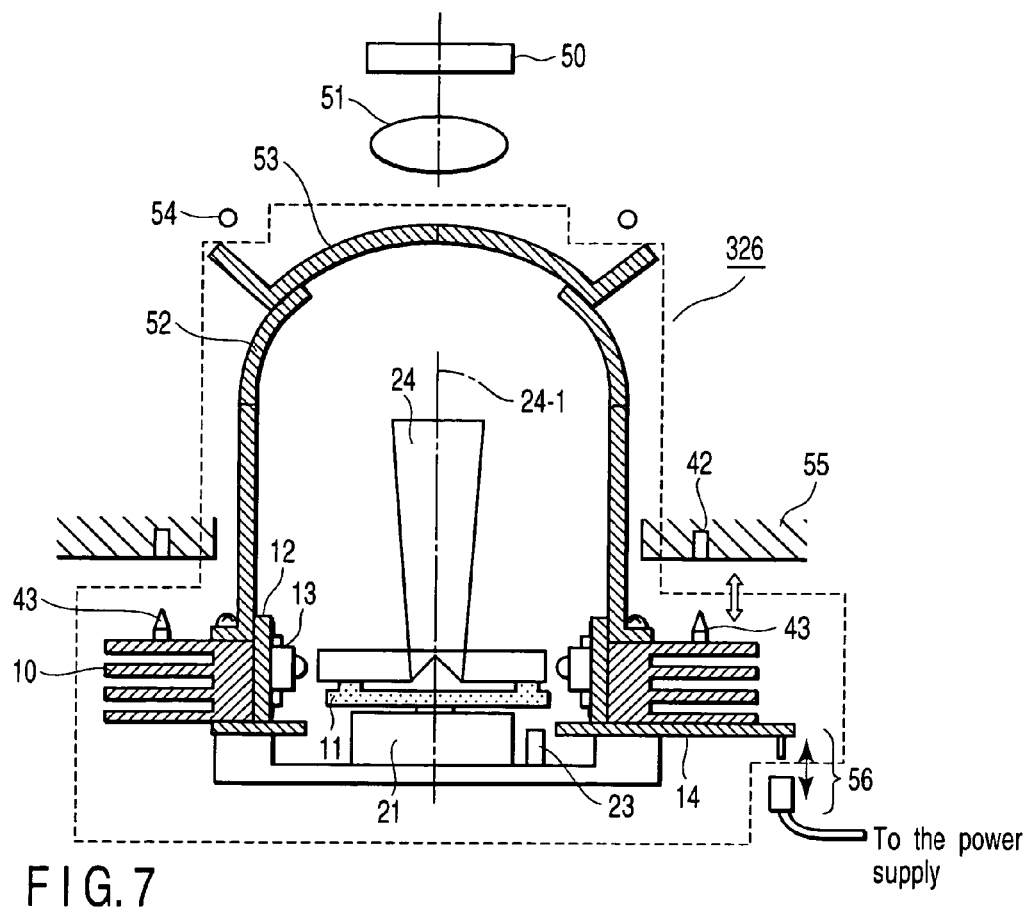
FIG. 7 is a view showing the configuration of a fourth embodiment of the present invention.

FIG. 7 is a view showing the configuration of the fourth embodiment of the invention.

In the fourth embodiment, a light source unit 326 comprises LEDs 13, an LED board 12, a heat sink 10, a light guide rod member 24, a rod holder 11, a rotation motor 21, a rotation sensor 23, a control circuit board 14, a protection cover 52, a shutter 53 for protecting the light emitting surfaces of LEDs 13, and positioning pins 43. Namely, the light source unit 326 and light guide rod member 24 which constitute the illumination optical unit are constructed as a single unit.

Figure 8:
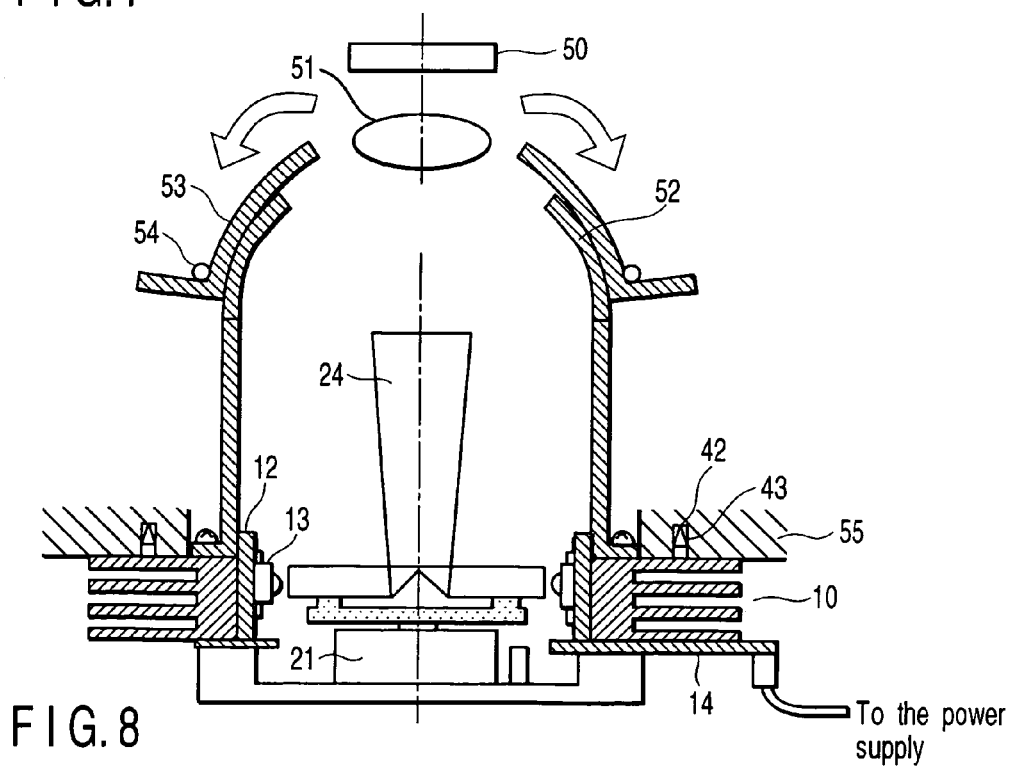
FIG. 8 is a view of a light source unit of the fourth embodiment in the state incorporated in an image projector.

In the process of mounting the light source unit 326 on the light source unit mounting member 55 of the apparatus, a shutter open/close pin 54 of the apparatus is energized in the direction of opening the shutter 53, the shutter 53 is fully opened when the light source unit 326 is fixed to the light source unit mounting member 55, and the light emitted from the light guide rod member 24 reaches an LCD 50 as a space modulation element through a relay lens 51 of the apparatus (FIG. 8).

When mounting the light source unit 326 in the apparatus, the position of the light source unit is determined based on the position of LCD 50. Positioning of the center axis of the light source unit 326 and the rotation center of the light guide rod member 24 is performed by using a positioning pin 43 in the heat sink 10 and a positioning hole in the light source unit mounting member 55 of the apparatus.

Positioning of the light source unit 326 and light guide rod member 24 in the rotation axis direction is performed by butting the light source unit 326 against the light source unit mounting member 55.

Positioning of the light source unit 326 around the rotation axis is performed by making the diameters of the two positioning pins 43 located symmetrically with respect to the rotation axis 24-1 different, preventing mounting in an incorrect direction.

In the fourth embodiment, the relationship between the rotating light guide rod member 24 and LEDs 13 does not change before and after replacement of the light source, and there is no possibility that the light guide rod member 24 and LEDs 13 are damaged by contacting each other. The LEDs 13 and light guide rod member 24 are covered by the protection cover 52 and shutter 53, eliminating the possibility of staining or breaking the light guide member 24 by careless touching during maintenance and replacement of the light source unit 326.

Figure 9:
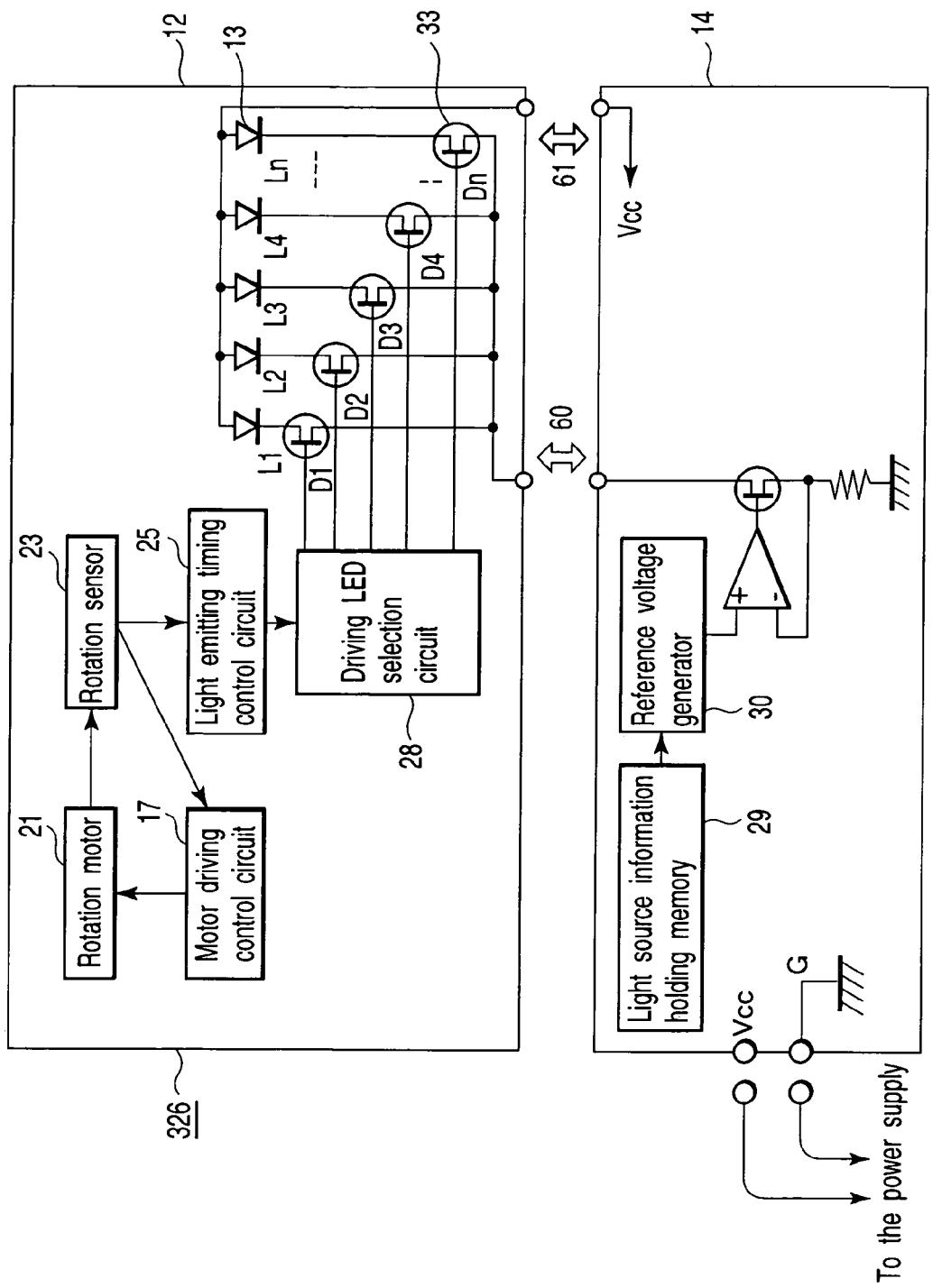
FIG. 9 is a function block diagram showing the configuration of the image projector according to the fourth embodiment of the invention.

FIG. 9 is a function block diagram showing the configuration of the image projector according to the fourth embodiment of the invention. In the fourth embodiment, the rotation motor 21, motor driving control circuit 17, rotation sensor 23, light emitting timing control circuit 25, driving LED selection circuit 28, LEDs 13, and LED driving circuit 33 are mounted on the LED board 12, constituting the light source unit 326. The light information holding memory 29 and reference voltage generator 30 are mounted on the control circuit board 14.

EMBODIMENT 5

Figure 10:
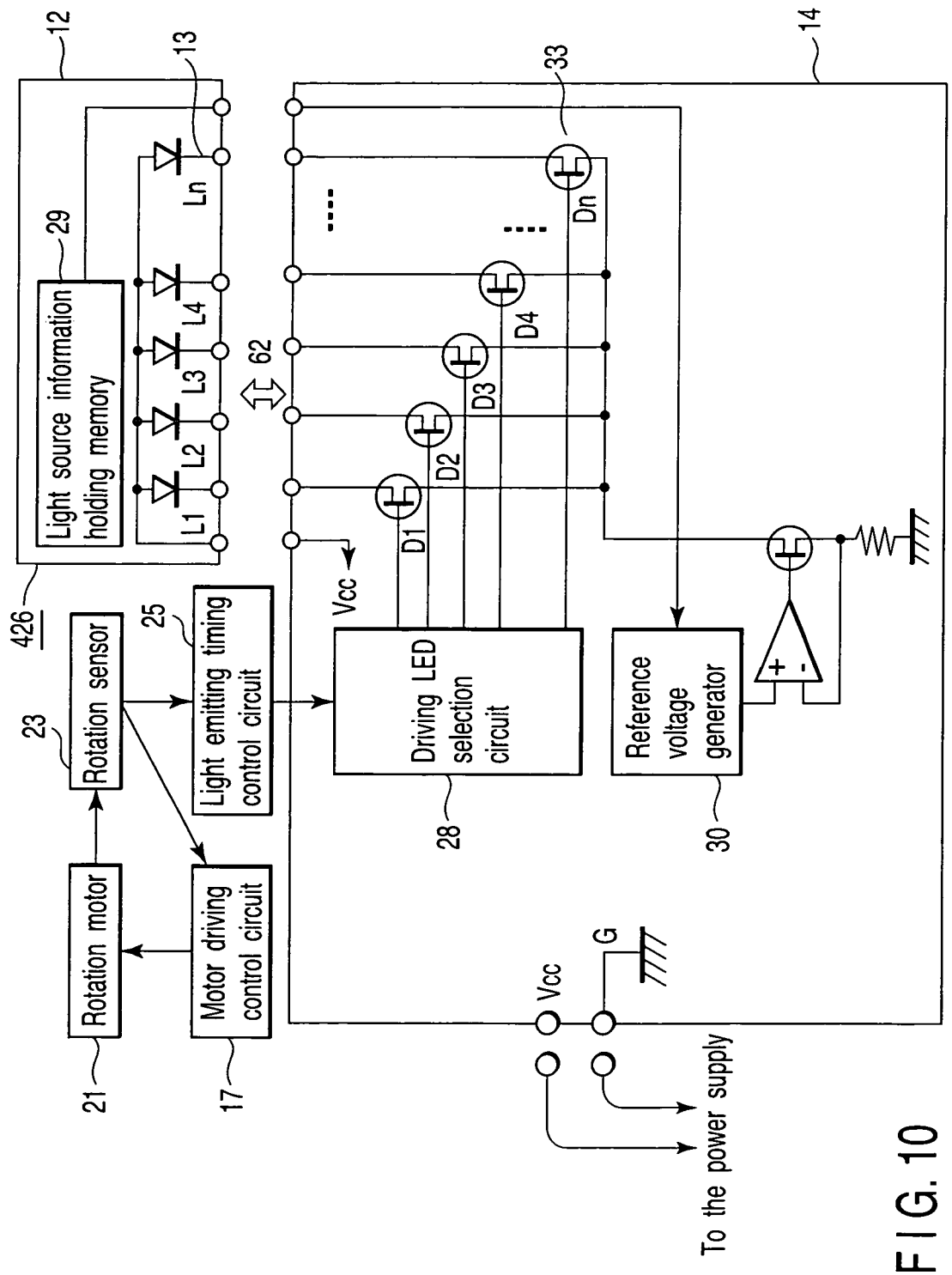
FIG. 10 is a view showing the configuration of a fifth embodiment of the present invention.

Explanation will be given on a fifth embodiment of the invention. FIG. 10 is a view showing the configuration of the fifth embodiment of the invention. In the fifth embodiment, the LEDs 13, LED board 12, and light source information holding memory 29 for holding the information about the LEDs 13 (e.g., a reference value of the voltage applied to the LEDs) are mounted on the LED board 12, constituting the light source unit 426. The driving LED selection circuit 28, reference voltage generator 30 and LED driving circuit 33 are mounted on the control circuit board 14.

In the fifth embodiment, even if the light source unit 426 is replaced by one provided with LEDs 13 which are driven on a different voltage value, the driving is always possible with an optimum driving voltage value without the need to provide a separate unit to adjust a driving current value.

(Remarks)

According to the above embodiments of the present invention, it is possible to provide an image projector having the following configurations.

1. An image projector which projects images according to inputted image data, comprising:

a light source unit having at least a plurality of LED light sources configured as a single unit for emitting an illumination light;

a space modulation element which is modulated according to inputted image data;

an illumination optical unit which guides the illumination light emitted from the light source, and illuminates the space modulation element; and a projection optical unit which projects an image illuminated by the illumination optical unit and modulated by the space modulation element, wherein the light source unit is configured removably from the image projector.

(Correspondence between Embodiments and Drawings)

The above configuration corresponds at least to FIGS. 1–4 explained in the description of embodiments.

(Effects)

The LED light source is replaceable, and it can be replaced when the life is nearing the end and the brightness is decreased. It can also be replaced by a higher performance LED light source (higher in the LED luminance, power consumption, etc.). The replacement cost can be minimized by limiting the configuration of a light source unit to a plurality of LEDs.

2. The image projector according to 1, wherein the light source unit has a driving unit to drive the LED light sources.

(Correspondence between Embodiments and Drawings)

The above configuration corresponds at least to FIG. 5 explained in the description of embodiments.

(Effects)

The driving unit is also replaced when the LED light source is replaced. This makes it possible to always use a driving unit having the characteristics optimum to LEDs even if the LED light source is replaced by one having different driving characteristics. This ensures adequate performance, and prevents defects caused by incorrect driving. Further, by providing the LED light source driving unit close to the LED light unit, the length of wiring between the driving unit using a large current and the LED light source is reduced, preventing deterioration of the driving current. The number of connector pins connecting the light source unit and control board is also reduced, simplifying the configuration and increasing the reliability.

3. The image projector according to 1, wherein the light source unit has a radiation unit which escape the heat generated by the LED light sources to the outside of the light source unit.

(Correspondence between Embodiments and Drawings)

The above configuration corresponds at least to FIG. 6 explained in the description of embodiments.

(Effects)

The radiation unit is also replaced when the LED light source is replaced. This makes it possible to always use a radiation unit having the radiation capacity optimum to LEDs even if the LED light source characteristics are changed. This ensures adequate radiation capacity, and prevents defects. Further, the tight fit between these parts is ensured in the manufacturing process, and the thermal conductivity from the LED light source to the radiation unit is maintained stably high.

4. The image projector according to 1, wherein the illumination optical unit is configured as one body with the light source unit, and removably from the image projector.

(Correspondence between Embodiments and Drawings)

The above configuration corresponds at least to FIGS. 7–9 explained in the description of embodiments.

(Effects)

The light source unit is replaced with the gap between the light emitting surface of the LED light source and the incident surface of the parallel rod which takes in the emitted light is held in the accuracy formed in the manufacturing process. This makes it possible to prevent fluctuations in the amount of light caused by changes in the gap, and a collision between the LED light source and the rotating parallel rod. Further, they can be replaced as a single unit, and there is no possibility that the user carelessly contacts and breaks them when replacing.

5. The image projector according to 4, wherein when the light source unit is mounted in the image projector, the light source unit is positioned based on the position of the space modulation element.

(Correspondence between Embodiments and Drawings)

The above configuration corresponds at least to FIGS. 7 and 8 explained in the description of embodiments.

(Effects)

The light source unit is positioned based on the position of LCD (Liquid Crystal Display) as a space modulation element. The illumination light emitted from the light source unit secures a necessary and sufficient area for a display area of LCD. This prevents a darkened image display in an image projector and uneven illumination in the display area.

6. The image projector according to 4, wherein the light source unit has a light source information holding member which holds the information about the LED light sources.

(Correspondence between Embodiments and Drawings)

The above configuration corresponds at least to FIG. 10 explained in the description of embodiments.

(Effects)

If the information about the accumulated operating time of the LED light source is held, it becomes an information source to inform the user of the time of replacement. If the information about the light emitting and driving characteristics of LED is held, an LED can be driven in the optimum state after replacement even if the LED is replaced by one of different characteristics.

7. The image projector according to 6, wherein the information about the LED light sources is a reference value of the voltage applied to the LEDs when the LED light sources are driven.

(Correspondence between Embodiments and Drawings)

The above configuration corresponds at least to FIG. 10 explained in the description of embodiments.

(Effects)

If a unit which holds the information about a reference value of the voltage applied to the LEDs when the LED light sources are driven is replaced together with the LED light source, the LED light sources having various characteristics can be driven in the optimum condition. It is possible to replace the LED light source by light sources having different expressing color characteristic or different luminance depending on purposes.

8. The image projector according to 1, wherein when the light source unit is mounted in the image projector, the light source unit is positioned based on the position of the illumination optical unit.

(Correspondence between Embodiments and Drawings)

The above configuration corresponds at least to FIG. 6 explained in the description of embodiments.

(Effects)

The light source unit is positioned to adjust to the rotation axis or the height of rotation surface of the light guide rod member as an illumination optical unit. Thus, the positions of the light emitting surface of LED and the light incident surface of the light guide rod member can be held correct. This prevents a collision between the LED and light guide rod member, and fluctuations in the efficiency of taking in light caused by changes in the gap between them, as well as prevents decreases in the efficiency of taking in light caused by displacement of these parts.

9. The image projector according to 1, wherein the light source unit has a shutter unit which protects the light emitting surface of the LED light sources; and the shutter unit opens when the light source unit is mounted in the image projector, and closes when the light source unit is removed from the image projector.

(Correspondence between Embodiments and Drawings)

The above configuration corresponds at least to FIGS. 7 and 8 explained in the description of embodiments.

(Effects)

While the light source unit is not mounted in the apparatus, it is possible to prevent adhesion of dust and fingerprints to the light emitting surface of LED or the rod to pass the emitted light, preventing a decrease in the amount of light. Further, since they are not exposed, there is no possibility of breaking the rod by hitting it carelessly against other parts of the apparatus when replacing.

10. The image projector according to 1, wherein the light source unit has a light guide unit which is synchronized with the lighting timing of the LED light sources and moved relatively to the LED light sources, and leads the illumination light emitted from the LED light sources which are sequentially lit in time series, to the space modulation element.

(Correspondence between Embodiments and Drawings)

The above configuration corresponds at least to FIGS. 1, 2, 3, 6, 7 and 8 explained in the description of embodiments.

(Effects)

The LEDs are sequentially switched to emit a pulse light, and the position relative to the light guide rod member which takes in the emitted light is selected and changed to meet the switching of the lights of LEDs. This provides efficient, high luminance LED light.

11. The image projector according to 10, wherein the light source unit has the LED light sources arranged on the circumference; and the illumination optical unit rotates the light guide unit around the center of the circumference on which the LED light sources are arranged.

(Correspondence between Embodiments and Drawings)

The above configuration corresponds at least to FIGS. 1, 2, 3, 6, 7 and 8 explained in the description of embodiments.

(Effects)

The light guide unit is moved relatively to the LED light sources by rotating the unit. This simplifies the mechanism of supplying power to LEDs, and increases the reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image projector which projects images according to inputted image data, comprising:
    a light source unit having at least a plurality of LED light sources configured as a single unit for emitting an illumination light;
    a space modulation element which is modulated according to inputted image data;
    an illumination optical unit which guides the illumination light emitted from the light source, and illuminates the space modulation element; and
    a projection optical unit which projects an image illuminated by the illumination optical unit and modulated by the space modulation element,
    wherein the light source unit is configured removably from the image projector;
    the illumination optical unit is configured as one body with the light source unit, and removably from the image projector; and
    the light source unit has a light source information holding member which holds the information about the LED light sources.

2. The image projector according to claim 1, wherein the information about the LED light sources is a reference value of the voltage applied to the LEDs when the LED light sources are driven.

3. An image projector which projects images according to inputted image data, comprising:
    a light source unit having at least a plurality of LED light sources configured as a single unit for emitting an illumination light;
    a space modulation element which is modulated according to inputted image data;
    an illumination optical unit which guides the illumination light emitted from the light source, and illuminates the space modulation element; and
    a projection optical unit which projects an image illuminated by the illumination optical unit and modulated by the space modulation element,
    wherein the light source unit is configured removably from the image projector;
    the light source unit has a shutter unit which protects the light emitting surface of the LED light sources;
    and the shutter unit opens when the light source unit is mounted in the image projector, and closes when the light source unit is removed from the image projector.

* * * * *